(12) United States Patent
Geibel et al.

(10) Patent No.: US 6,387,271 B1
(45) Date of Patent: *May 14, 2002

(54) METHOD FOR SEPARATING SOLID PARTICULATES FROM A LIQUID

(75) Inventors: Stephen A. Geibel, Cortland; Tanweer U. Haq, Tully; Donald B. Stevens, Sr., Port Washington, all of NY (US)

(73) Assignee: Pall Corporation, East Hills, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/029,904

(22) PCT Filed: Sep. 13, 1996

(86) PCT No.: PCT/US96/14706

§ 371 Date: May 11, 1998

§ 102(e) Date: May 11, 1998

(87) PCT Pub. No.: WO97/10047

PCT Pub. Date: Mar. 20, 1997

Related U.S. Application Data

(60) Provisional application No. 60/003,773, filed on Sep. 14, 1995.

(51) Int. Cl.⁷ .............................................. B01D 61/00
(52) U.S. Cl. .................. 210/651; 210/500.36; 210/798; 210/636; 210/321.86
(58) Field of Search .............................. 210/805, 767, 210/500.36, 798, 321.77, 321.86, 493.1, 636, 650, 651; 376/313

(56) References Cited

U.S. PATENT DOCUMENTS

| 4,257,997 A | | 3/1981 | Soehngen et al. |
| 4,504,389 A | | 3/1985 | Rundzaitis |
| 4,756,875 A | * | 7/1988 | Tajima et al. ................. 376/313 |
| 4,778,601 A | | 10/1988 | Lopatin et al. |
| 4,828,772 A | | 5/1989 | Lopatin et al. |
| 4,833,172 A | | 5/1989 | Schwartz et al. |
| 5,051,183 A | * | 9/1991 | Takita et al. ............ 210/500.36 |
| 5,126,052 A | * | 6/1992 | Lane et al. |
| 5,230,760 A | | 7/1993 | Tanabe |
| 5,258,127 A | | 11/1993 | Gsell et al. |
| 5,270,401 A | | 12/1993 | Sham et al. |
| 5,358,552 A | | 10/1994 | Seibert et al. |
| 5,370,889 A | | 12/1994 | Fortuin et al. |
| 5,376,445 A | | 12/1994 | Fortuin et al. |
| 5,377,244 A | | 12/1994 | Stenger |
| 5,483,562 A | * | 1/1996 | Kornfeldt et al. ............ 376/287 |
| 5,543,047 A | | 8/1996 | Stoyell et al. |

FOREIGN PATENT DOCUMENTS

| AU | 71350/87 | | 4/1986 |
| DE | 3712491 | | 4/1987 |
| EP | 484984 | | 11/1991 |
| EP | 504954 | | 2/1992 |
| EP | 497641 | | 8/1992 |
| WO | 94/11082 | * | 5/1994 |

OTHER PUBLICATIONS

Head, R.A.; "Recent Advances in BWR Condensate Filtration"; GE Nuclear Energy, pp. 1–8, Apr. 12, 1994.

Economy, et al.; "Morphological Modification of UHMPE Fibers", Polymers for Advanced Technologies, vol. 5, pp. 349–357, 1994.

* cited by examiner

*Primary Examiner*—Joseph W. Drodge
*Assistant Examiner*—Richard W. Ward
(74) *Attorney, Agent, or Firm*—Leydig, Voit & Mayer, Ltd.

(57) ABSTRACT

A method for removing iron-containing contaminants from condensate from a power generating plant includes passing the condensate through a plurality of pleated filter elements contained within a housing, including direct the condensate through a pleated hydrophilic film comprising ultra-high molecular weight polyethylene. The invention is capable of removing fine particulate matter and provides long filtration cycles between backwashing.

6 Claims, 1 Drawing Sheet

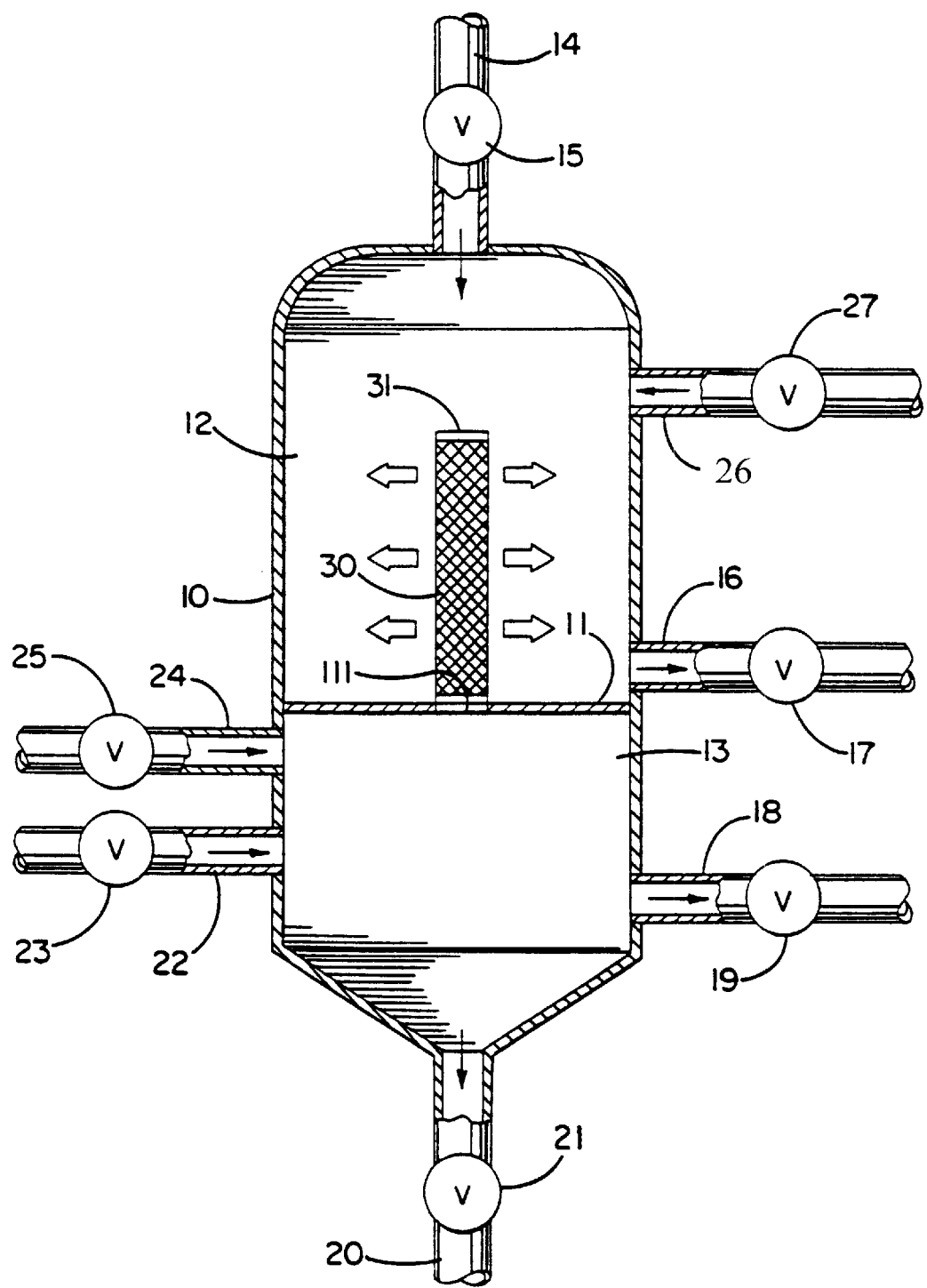
FIGURE

METHOD FOR SEPARATING SOLID PARTICULATES FROM A LIQUID

This application claims the benefit of U.S. Provisional Application No. 60/003,773, filed Sep. 14, 1995.

BACKGROUND OF THE INVENTION

The present invention is directed to a method and apparatus for purifying aqueous liquids containing particulate matter and to a filter element, assembly, and method for effecting such purification. More specifically, the present invention relates to the treatment of aqueous liquids employed in power plants, more particularly nuclear power plants, to reduce the amount of insoluble iron present in such aqueous liquids.

Techniques, materials and devices for separating particulate matter from fluids have existed for centuries. Many such separations involve relatively low-level technology and simple materials. As science and technology have advanced, however, new materials and techniques have permitted separations to be achieved to meet the requirements for ever purer materials. Considering the developments in materials science in recent years, when viewed broadly, the separation of particulate matter from a fluid might seem to be a simple task. However, many such separations remain unresolved or, more typically, resolved only to the extent that the results obtained fall short of the purification sought.

Some of the factors which have resulted in less than complete separation include the large volumes of fluids being processed, the type of filtration media available for such separation processes, the nature and chemical composition of the particulate matter being removed, the fineness of the particulate matter and the nature of the fluids in which the particulate matter is found.

To illustrate some of the problems which result from such factors, one could consider any large scale industrial process in which large volumes of liquid are employed. The adverse effects of particulate matter present in the liquids being employed will vary from one process to another. Thus, while particulate matter may be tolerated in any amounts in certain processes, other processes require total elimination of particulate matter. Likewise, the particle size of such solid matter may be of little or no significance in some processes but critical in others. Intermediate these extremes, the specifications of some processes permit certain amounts of solid particulate matter as long as the particles fall above or below predetermined sizes.

Techniques and filtration materials have ranged at the low technology end of the separation spectrum from simple sieves or beds of readily available materials to the other end of the spectrum where new media have been developed to achieve separations of particulate matter from fluids in which the physical and chemical natures of the fluids, particulate matter and/or filtration media are carefully selected to achieve separation. The present invention relates to the latter type of separation.

One area in which removal of fine particulate contaminants is a major concern, is in the field of electric power generation systems. In such systems, which may be fossil fuel powered or nuclear powered, high purity feedwater is heated in a boiler to create either pressurized high temperature water or steam which is then expanded through a steam turbine. The shaft of the turbine is connected to an electric generator shaft which, when rotated, creates electrical energy. The steam which exits from the turbine is condensed in a heat exchanger and, typically, is subsequently purified and reheated. The condensed water is then directed back to the boiler as feedwater, completing a power cycle.

Frequently, the electric power generating plants purify the condensate to remove contamination, particularly ionic materials and particulate matter, which may either be present in the raw water supply, or may enter the feedwater, steam, or condensate from a variety of sources during the power cycle. Ionic materials may be removed by the use of demineralizers, to purify condensate through an ion exchange technique. Two types of demineralizers are used for condensate purification, namely, deep bed demineralizers and filter demineralizers.

Deep bed demineralizers use resin beads to remove dissolved ions in the condensate. Specifically, the condensate is passed through a bed of resin beads which are retained in a demineralizer vessel. The deep bed demineralizers typically have an effective pore rating in the condensate water of about 40 to 50 microns and are only marginally useful in removing particulates from the condensate.

Filter demineralizers employ powdered ion exchange resins and/or inert filter aids such as cellulosic fibers which are precoated onto fine porous elements and are sometimes referred to as "precoats". Such elements typically include spirally welded metal elements, powdered metal elements, wedge wire elements and yarn or string wound elements. The condensate is passed through the precoated elements which remove dissolved contaminants and trap particulates. The precoats on the filter demineralizers typically have an effective pore rating of about 5 to 30 microns, and the underlying filter media have a pore rating of about 5 to 120 microns. The filter demineralizers have an overall effective pore rating of about 5 to 30 microns and are, therefore, somewhat more effective in removing particulates from condensate, as compared to deep bed demineralizers. Under certain operating conditions, however, solids levels are relatively high and lead to the need for extensive backwashing of the precoat resin, with the concomitant high cost of operation of the filter demineralizers.

Contaminants in feedwater, steam and condensate in fossil fuel-powered generating plants typically must be maintained at a level of total suspended solids of no greater than about 50 to 250 parts per billion (ppb), and most typically no more than about 50 ppb total suspended solids. In nuclear power plants tolerances for solid particulate contaminants are frequently much lower, typically about 0.025 to about 2.0 ppb. Certain types of contaminants, such as iron-containing contaminants are tolerated even less in nuclear power plants, particularly of the Boiling Water Reactor (BWR) type.

The nuclear power industry has recognized that as an important first step in reducing radiation fields and occupational exposure, it is necessary to reduce iron input to the BWR primary system. For feedwater iron, the recognized optimum concentration is not more than about 0.1 to 0.5 ppb. Several techniques have been employed to reduce feedwater iron levels for optimized water chemistry using condensate filtration.

Typically, iron found in the reactor vessel enters by way of the feedwater system and deposits on fuel cladding surfaces where soluble reactor water impurities, such as cobalt, are absorbed. Subsequently, the absorbed metal impurities become neutron activated and a portion thereof are later released to the reactor water as soluble or insoluble radioactive isotopes. Thereafter, they are transported by reactor water throughout the primary system and accumulate on piping and equipment surfaces, resulting in increased dry well and reactor building general area dose rates. Thus, by reducing the concentration of iron in the primary system, the amounts of deposited iron and non-radioactive cobalt ($^{59}Co$) absorbed by the iron is reduced, resulting in a reduced source of activated $^{60}Co$.

Although methods have been developed to limit radiation buildup on primary system surfaces, there has developed and still remains a strong need to limit feedwater iron concentrations. Thus, a technique has been employed recently in which zinc is injected into the feedwater to maintain a specified concentration of soluble zinc in the reactor water which thereby limits radiation buildup on primary piping components. In a modification of the technique which optimizes control of radiation buildup, a depleted zinc oxide method was developed to minimize the unwanted production of radioactive $^{65}Zn$ from neutron activation of $^{64}Zn$. When the concentration of feedwater iron is high, however, the amount of depleted zinc oxide necessary to maintain the desired reactor water concentrations of zinc is increased due to the absorption of zinc by iron. As a result, high feedwater iron concentrations increase the amount of zinc necessary to produce the beneficial results. Accordingly, it is important to maintain low feedwater iron levels to reduce the cost associated with high amounts of depleted zinc oxide that are necessary to control radiation.

Reduced iron feedwater concentrations also benefit in the use of hydrogen water chemistry (HWC). This is a technique for imparting reducing characteristics to water by forming an aqueous solution of hydrogen in water.

Improved condensate filtration offers further advantages in addition to controlling radiation buildup and reducing occupational exposure. By further reducing the amount of insoluble iron entering deep bed demineralizers, the life and performance of the resins used therein can be substantially improved. Thus, reducing iron fouling, or coating of the resin beads with crud, will improve the ion exchange performance and substantially eliminate the need to periodically clean the resins by ultrasonic means or backwashing. In addition, since such cleaning methods may be virtually eliminated, the resin bed is not disturbed or mixed and the usable ion exchange capacity is increased by maintaining the chromatographic integrity of the resin column by maintaining resin beads with low ionic loading at the bed effluent. The effect of reducing ion concentrations introduced to deep bed demineralizers is expected to be improved feedwater quality and reduced liquid and solid radioactive waste. Furthermore, with improved ion exchange performance derived from prefiltration, plants which use chemical regeneration can reduce the frequency of regeneration, or possibly eliminate the necessity of regeneration entirely.

Heretofore, prefiltration of iron particulates from power generating plants has required frequent backwashing of the filter elements to avoid excessive pressure drop across the filter medium. This is troublesome from the standpoint of maintenance cost. Moreover, in the case of nuclear power plants, frequent backwashing requires diversion of a considerable quantity of radioactive condensate as backwash liquid which poses its own disposal problems. Often, the backwashing cycle of currently used prefilters may be as short as five days.

SUMMARY OF THE INVENTION

It is accordingly an aspect of the invention to filter fine particulate matter, for example, down to 0.5 $\mu m$ or even smaller.

It is another aspect of the invention to provide a method for treating condensate from a power generating plant, particularly a nuclear power plant, and most particularly a boiling water reactor nuclear power generating plant, which can efficiently and economically reduce the contaminant level of the condensate to the requisite level.

It is another aspect of the invention to provide a treatment method which can also be used to continuously purify or polish condensate from a power generating plant, particularly a nuclear power generating plant and most particularly a BWR nuclear power generating plant to ensure that the contaminant level of the condensate remains within an acceptably lower level.

It is a further aspect of the invention to provide a filtration element, filter assembly and a method of treating aqueous condensate from a power generating plant, particularly a nuclear power generating plant, and most particularly a BWR nuclear power generating plant, to reduce feedwater iron to a range of 0.1 to 0.5 ppb.

It is still another aspect of the invention to provide a purification method and separation element for treating condensate from a power generating plant, particularly a nuclear power generating plant, and most particularly a BWR nuclear power generating plant, to achieve minimum 21-day prefilter and 50-day filter/demineralizer cycles (the length of time backwashing operations for non-precoated and precoated filters, respectively) with 30 ppb inlet crud levels.

It is yet another aspect of the invention to provide a method of treating condensate from a power generating plant, particularly a nuclear power generating plant, and most particularly a BWR nuclear power generating plant, which requires less than 40,000 gallons per year of liquid radioactive waste to backwash the full flow system.

It is still another aspect of the invention to provide a purification element and a method which treats condensate from a power generating plant, particularly a nuclear power generating plant, and most particularly a BWR nuclear power generating plant, which achieves a filter life durability of at least two fuel cycles (i.e., the time between refueling) or three years.

It is yet another aspect of the invention to provide a purification method and a filter element which significantly reduce the frequency of backwashing required to provide continued effective filtration.

It is also an aspect of the invention to provide a purification method with a filter element having a high surface area, inexpensive filter membrane.

In accordance with one aspect of the invention, a method for separating iron-containing particulate or colloidal contaminants from an aqueous liquid comprises passing aqueous liquid including the iron-containing contaminants in one direction through a pleated filter element. Passing the aqueous liquid through the pleated filter element includes directing the aqueous liquid through a pleated hydrophilic film comprising an ultra-high molecular weight polyethylene and having a pore size in the range from about 0.001 micron to about 10 microns and reducing the iron-containing contaminants in the aqueous liquid to a level of about 2 parts per billion or less. The method further comprises cleaning the pleated filter element by directing a backwash fluid in an opposite direction through the pleated filter element, including directing the backwash fluid in the opposite direction through the pleated, hydrophilic, ultra-high molecular weight polyethylene film.

The present invention may be employed in power generating systems during startup and steady state operating conditions. The present invention reduces the concentration of solid particulate contaminants in aqueous liquids, particularly aqueous liquids employed in power plants to no more than about 2 ppb, preferably no more than about 1 ppb and most preferably no more than about 0.5 ppb of total suspended solids. The present invention also reduces iron-containing particulate contaminants in power plant condensates to a level of no more than about 2 ppb, preferably no more than about 1 ppb and most preferably no more than about 0.5 ppb. In addition, because of the nature of the filters and filtration systems employed, in most situations infrequent or no backflushing or backwashing is required for prolonged use of the filters, although such backwashing is not proscribed.

The present invention includes a method of treating condensate polishing in the environment of a power plant, particularly a nuclear power plant, and most particularly a BWR nuclear power plant, which includes passing the contaminated condensate through a hydrophilic filter medium so as to reduce the total suspended solids of the condensate to no more than about 0.5 ppb. Preferably, the filter medium employed in the present invention has a removal efficiency of about 99.98% at no more than about 1.5 microns.

When the filter medium or filter element of the present invention is placed upstream of an ion-exchange resin, it is sometimes referred to as a "prefilter". When placed downstream of the ion-exchange resin, the medium or element is sometimes simply referred to as a "filter" while the ion-exchange resin, coated on a mesh or other porous substrate, is termed a "precoat".

The present invention is also directed to an apparatus and to filter elements which are capable of reducing concentrations of contaminants to the above-indicated levels. The apparatus and filter element are also capable of removing fine solids ranging from submicron particle sizes (about 0.5 $\mu$m) up to the largest particles found in aqueous particulate-containing liquids commonly encountered in the environment of a power plant. Typically, this is about 10 microns.

BRIEF DESCRIPTION OF THE DRAWING

The single FIGURE is a cross-sectional elevational view of a filter assembly according to the invention.

DETAILED DESCRIPTION OF THE INVENTION

The present invention relates to a filtration element incorporating an ultra high molecular weight polyethylene (UHMMWPE) filter medium and to a method of filtering particulates from a liquid using the medium.

In a preferred embodiment, the invention relates to a filtration element and to a method of treating aqueous condensate obtained both at startup and steady state conditions during the operation of a power generating plant, particularly nuclear power generating plants and most particularly BWR nuclear power generating plants. During normal, steady state operation, the condensate becomes contaminated with solid particulates from the equipment surfaces contacted by the condensate. If there is a down-time period, however, the condensate becomes significantly more contaminated with particulate matter, such as metal oxides and the like resulting from the reaction of air with the equipment surfaces. The solid particulate level of the condensate at start-up in a nuclear power generation plant usually tends to be about 200–500 ppb of total suspended solids and for BWR nuclear power generation plants, about 50–200 ppb total suspended solids, and more typically at least about 150 ppb and 50 ppb total suspended solids, respectively. However, for proper nuclear power plant operation, generally the condensate must contain no more than about 10 ppb, preferably no more than about 2 ppb, and in the case of BWR nuclear power generation plants, suspended solids in the condensate should be no more than about 5 ppb, preferably no more than about 0.5 ppb and most preferably no more than about 0.3 ppb.

To achieve the object of treating the condensate to efficiently and economically reduce contaminants to an acceptable level both upon start-up and during steady-state operation, the method according to the present invention passes a contaminated condensate through a filter medium according to the present invention, prior to passing the condensate through a resin bed or after passing the liquid through a resin precoat to reduce the level of contaminants in the condensate to an acceptable level.

The filter medium of the invention comprises an ultrahigh molecular weight polyethylene (UHMWPE). This material is especially advantageous when used for removal of solid particulate or colloidal iron compounds, such as iron oxide. Typically, such UHMWPE materials have average molecular weights of from about $1 \times 10^5$ to about $1 \times 10^6$. UHMWPE material suitable for use in the present invention preferably have very high moisture vapor transmission ratios, typically at least about 7500 g/24 hour·m$^2$, preferably at least about 10,000 g/24 hour·m$^2$. The UHMWPE preferred for use in the present invention comprise films having pores and channels with "diameters" in the range of between about 0.001 and about 10 microns, preferably between about 0.01 and about 5 microns. Suitable UHMWPE materials for use in the present invention are described in U.S. Pat. Nos. 5,370,889 and 5,376,445, both of which are hereby incorporated by reference in their entirety. Preferred for use in the present invention are UHMWPE membranes or films available from DSM N.V., Heerlen, Netherlands. Most preferred in the present invention is an UHMWPE membrane which is available from DSM N.V. as Solupor 7P20, a sintered and stretched membrane material having a pore rating of 1 micron.

In a preferred embodiment, the filter medium has a removal efficiency of about 99.0% at a pore rating no greater than about 5 microns. The filter medium preferably has a 99.98% removal efficiency at a pore rating of about 3 microns or less. The most preferred filter medium also has a 99.98% removal efficiency at a pore rating of about 1.5 microns or less. At high pore ratings, for example, those above about 10 microns, the filter medium will not reduce the contaminant level of the condensate to an appropriately low level, while at lower pore ratings, for example, below about 0.001 microns, the filter medium will exhibit an undesirably high pressure drop.

The removal efficiency of the filter medium is determined herein by the OSU-F2 test, also known as the beta rating system. Specifically, for data in the 0.5 to 25 $\mu$m range, a standardized silicious contaminant, AC Fine Test Dust, is prepared as a stable suspension in water at a preset concentration, and the suspension is pumped at 5 gpm/ft$^2$ (3.4l/sec./m$^2$) through the filter element. For data in the 25 to 90 $\mu$m range, a military standard oil with a viscosity of 10 centipoise is used with a standardized silicious contaminant, AC Coarse Test Dust, and the suspension is pumped at 10 gpm/sq. ft. through the filter element. The test system is equipped with an upstream and a downstream particle counter to count the amount of contaminant of particular diameters upstream and downstream of the filter medium, and these counts are used to determine the removal efficiencies with respect to particular contaminant diameters. Simultaneously with the efficiency measurements, the pressure drop across the filter element is measured. The quantity of incident standard contaminant required to develop a pressure of 40 psi across the filter element is generally reported as the dirt capacity of the filter element.

The filtration media of the present invention are used to remove solid particulate and gelatinous materials from aqueous solutions. In a preferred embodiment UHMWPE media employed in the present invention are treated in order to render them hydrophilic. This may be accomplished by one of several methods. A first method involves treatment with a suitable surfactant such that the surfactant is incorporated into the medium. Surfactants suitable for use in the present invention are those which are approved for use in boiling water with minimal leaching of the surface active agent. A preferred surfactant for use in the present invention when employing this method is Hallburton Pen-5. The method of incorporating the surface active agent into the medium may be accomplished by conventional means.

While a surfactant incorporation method of rendering the medium hydrophilic may be suitable in a number of applications, gradual leaching of the surfactant in use causes mass transfer of the surfactant from the medium to the aqueous phase. Ultimately this reduces the hydrophilic characteristics of the medium while at the same time increasing the soluble contaminant level of the water. Where ion exchange columns are employed, however, the level of contamination may be minimized.

An alternate treatment method avoids mass transfer due to leaching and provides the necessary hydrophilic characteristics to the media by permanently, chemically altering the surface of the media. This involves grafting methods in which the medium is exposed either to chemical means, such as wet or dry oxidation, or by coating the surface by depositing a polymer thereon, or alternatively, by a grafting reaction in which the media are exposed to an energy source, such as heat, a Van Der Graff generator, ultraviolet light, exposure to gamma radiation, or to various other forms of radiation. The preferred method is by exposing the medium to a gas plasma treatment, particularly an oxygen plasma treatment.

In the present invention, the membranes or media, either pleated or unpleated, are preferably permanently, chemically modified by exposure to low temperature oxygen gas plasma. Typically this is done by introducing oxygen gas into an evacuated apparatus through a conduit until a suitable gas pressure differential across the conduit is obtained. A RF electromagnetic field is generated in the plasma zone by application of current of the desired frequency to the electrodes from the RF generator. Ionization of the gas in the tube is induced by the field, and the resulting plasma in the tube modifies the fibers or medium in the plasma zone. While a number of different gases may be employed, oxygen is most preferred.

Typical parameters for treatment of the media of the present invention with a gas plasma may include power levels from about 10 watts to about 3,000 watts, preferably about 500 watts to about 2,500 watts. The RF frequency employed is about 1 kHz to about 100 MHz, preferably about 15 kHz to about 50 MHz. The period of exposure of the media is about 5 seconds to about 12 hours, preferably about 1 minute to about 2 hours. Gas pressures may be employed which are about 0.001 to about 100 torr, preferably about 0.01 to about 1 torr; and a gas flow rate of about 1 to about 2,000 standard cc/min. A more detailed explanation of the method employed may be found in U.S. Pat. No. 5,258,127, incorporated herein by reference in its entirety.

The base weight of the UHMWPE is suitably within the range of about 4 to about 20 grams/m$^2$, preferably about 7 to about 8 grams/m$^2$. A suitable range of thickness is about 20 to about 300 microns, preferably about 50 to about 70 microns. The mean pore size, as determined by a Coulter porometer, suitably is about 0.2 to about 7 microns, preferably, about 1 to about 2 microns. The maximum pore size, as determined by a Coulter porometer, is suitably in the range of about 0.5 to about 20 microns, preferably less than about 4 microns. The Gurley air permeability rating of the medium has a suitable range of about 1 to about 30 seconds/50 milliliters, preferably, less than about 5 seconds/50 milliliters.

As indicated above, the preferred UHMWPE media employed as the filter membranes of the present invention are hydrophilic. By "hydrophilic" it is meant that the medium has a "critical wetting surface tension" (CWST) equal to or greater than the surface tension of water. To determine the CWST of a porous or microporous medium a series of liquids can be prepared, each with a surface tension of about 3 dynes/cm higher compared with the one preceding. A drop of each may then be placed on a porous surface and observed to determine whether it is absorbed quickly, or remains on the surface.

In order to characterize this behavior of a porous medium, the term "critical wetting surface tension" has been defined as described below. The CWST of a porous medium may be determined by individually applying to its surface, preferably dropwise, a series of liquids with surface tensions varying by 2 to 4 dynes/cm, and observing the absorption or non-absorption of each liquid. The CWST of a porous medium, in units of dynes/cm, is defined as the mean value of the surface tension of the liquid which is absorbed and that of a liquid of neighboring surface tension which is not absorbed.

In measuring CWST, a series of standard liquids for testing are prepared with surface tensions varying in a sequential manner by about 2 to about 4 dynes/cm. Ten drops of each of at least two of the sequential surface tension standard liquids are independently placed on representative portions of the porous medium and allowed to stand for 10 minutes. Observation is made after 10 minutes. Wetting is defined as absorption into or obvious wetting of the porous medium by at least nine of the ten drops within 10 minutes. Non-wetting is defined by non-absorption or non-wetting of at least nine of the ten drops in 10 minutes. Testing is continued using liquids of successively higher or lower surface tension, until a pair has been identified, one wetting and one non-wetting, which are the most closely spaced in surface tension. The CWST is then within that range and, for convenience, the average of the two surface tensions is used as a single number to specify the CWST.

Appropriate solutions with varying surface tension can be prepared in a variety of ways, however, those used in the development of the product described herein were:

TABLE 1

| Solution or fluid | Surface Tension, (dynes/cm) |
|---|---|
| Sodium hydroxide in water | 94–110 |
| Calcium chloride | 90–94 |

TABLE 1-continued

| Solution or fluid | Surface Tension, (dynes/cm) |
|---|---|
| in water | |
| Sodium nitrate in water | 75–87 |
| Pure water | 72.4 |
| Acetic acid in water | 38–69 |
| Ethanol in water | 22–35 |
| n-Hexane | 18.4 |
| FC77 (3M Corp.) | 15 |
| FC84 (3M Corp.) | 13 |

The filter media used in the invention may have any suitable overall structure. The filter medium, for example, may be flat or pleated, and may be configured into a square, oblong, or circular design. The filter medium is preferably of a long, cylindrical, open core design, with the filtrate, e.g., condensate, preferably flowing from outside the filter medium toward the open core and out an open end of the filter medium.

Pleated versions of the filter element employing the medium according to the present invention are preferred since they provide significantly higher surface area for the volume occupied. Accordingly, filter elements employing such pleated filter medium are more efficient and provide longer service life. In addition, in pleated cylindrical filters, a preferred embodiment, the pleated elements may be configured such that the pleats are laid over or formed at an angle of about 45° from a plane positioned normal with respect to the surface of the filter medium, a most preferred embodiment. More particularly, in a most preferred embodiment, the pleats of the pleated filter medium include a pair of legs and a height, h, greater than $(D-d)/2$ and less than $h_{max}=(D^2-d^2)/[4(d+2t)]$ where D and d are an outer diameter and an inner diameter, respectively, of the filter element and t is a thickness of each leg. A further description of such laid over pleat arrangement may be found in U.S. Pat. No. 5,543,047 which is hereby incorporated by reference in its entirety.

Typically, the filter media of the present invention, particularly the preferred pleated media, include upstream and/or downstream (preferably both) support and drainage materials. These materials are generally highly porous materials, such as open mesh materials which have pore diameters substantially larger than the filter media with which they are used. Like the other materials from which the filter element is formed, the support and drainage materials are highly resistant to deterioration under conditions in which the condensate passes through the filter material. Accordingly, materials such as stainless steel and polymeric materials may be employed. Polypropylene is particularly preferred. The support and drainage mesh range in thickness from about 0.002 inch (0.05 mm) to about 0.040 inch (0.10 mm) thick, preferably about 0.003 inch (0.076 mm) to about 0.010 inch (0.025 mm) thick. If maximum surface area is sought, thinner support and drainage materials are used for tightly pleated filter elements, particularly laid-over pleated elements.

Although thinner mesh support and drainage materials may be used adjacent both surfaces of the filter medium in high surface area filter elements, it is preferred to use a thicker mesh at the upstream surface and a thinner layer of mesh at the downstream surface. This allows adequate support at the upstream surface and permits the downstream surfaces of the filtration medium forming the pleats to be spaced more closely than with a thicker support and drainage material. This achieves several advantages over elements with thicker downstream mesh. First, this increases the amount of filtration medium in the annular volume provided for the medium, that is, it maximizes the filtration surface area in a given envelope for the filter element. Secondly, this embodiment provides more space on the upstream surface of the filtration medium relative to the downstream surface thereof for collection of the separated solid and gelatinous material. Thirdly, this embodiment allows the pleats to be filled uniformly from the bottom of the pleat since the contaminant-containing fluid takes the path along a surface of the filtration media where least resistance exists. This is normally at the surface where the mesh is thickest. As a result, this allows full use of the filtration medium.

Accordingly, a preferred filter element having very high surface area includes an upstream polypropylene support and drainage mesh having a thickness of about 0.005 inch (0.13 mm) to about 0.010 inch (0.25 mm) thick and a downstream polypropylene support and drainage mesh having a thickness of about 0.003 inch (0.076 mm) to about 0.005 inch (0.13 mm) thickness with an ultrahigh molecular weight polyethylene membrane of the type described above sandwiched therebetween.

In a preferred "medium" surface area version of such an element, the construction and materials would be the same but a 0.005 inch (0.13 mm) to about 0.010 inch (0.25 mm) thick polypropylene mesh would typically be used downstream of the ultrahigh molecular weight polyethylene membrane medium rather than the 0.003 inch (0.76 mm) to 0.005 inch (0.13 mm) thick mesh used with the high surface area element.

Although backwashing is unnecessary with the high surface area filter elements according to the present invention, both the high surface area embodiment and the medium surface area embodiment may be backwashed, if desired, and the latter embodiment is typically backwashed several times over its lifetime. The reduced edgewise flow resistance provided by the thicker downstream support and drainage material of the medium surface area version of the invention is thought to contribute to more effective backwashing of the UHMWPE filter element. Such backwashing may be repeated periodically to achieve effective filtration and continued service life. Since the high surface area version has a higher dirt capacity than the medium surface area version, and such elements last at least a fuel cycle in a BWR power plant under normal conditions without backwashing, these elements may simply be disposed of if crud loading conditions cause the pressure drop to exceed the terminal pressure drop for the filters, or optionally they may be backwashed prior to the completion of a fuel cycle. The filters may also be backwashed prior to removal and disposal of the element to reduce radiation exposure to personnel.

In addition to the difference in thickness of the support and drainage material employed in each version, particularly at the downstream surface of the filter medium, the "high" and "medium" surface area embodiments of the invention may be distinguished by the proportion of the annular volume (defined by the length of the filtration medium times the distance between the surfaces defined by the crests and troughs of the pleats) occupied by the pleated filter medium and support and drainage layers. That is, the filter medium and support and drainage materials occupy a larger proportion of the annular volume, and in so doing achieve a higher surface area to volume ratio, in the high surface area embodiment than they do in the medium surface area embodiment.

An additional component of the filter element, a core, end caps, a cage and/or wrap are typically employed for cylindrical filter elements. These may be formed from any suitable corrosion resistant materials. In a preferred embodiment, the filter element pack is wrapped around a 316 L stainless steel core and the ends of the filter are held in place with a tightly fitting stainless steel ring. The filter element is wrapped with a stainless steel woven mesh, preferably a helically wrapped continuous strip of double selvage stainless steel square weave mesh, preferably having a tension of about 70 pounds. The mesh wrap is welded over the stainless steel rings and the mesh is trimmed just beyond the weld. The metal mesh provides additional support and protection for the filter medium, particularly if the filter element is to be subjected to backwashing. The element is then fitted with end caps, preferably glass filled polypropylene end caps which are melt bonded to seal the media to the end caps.

If an ion exchange resin precoat is desired, a stainless steel mesh having a pore rating sufficiently small to retain the precoat (on the order of about 70 microns), is used as the outer mesh wrap.

The filter medium may be used without a resin precoat or with an upstream resin precoat applied to a mesh at the periphery of the element, depending upon the particular situation.

As shown in the FIGURE, one example of a filter assembly embodying the present invention includes a housing 10 which is divided by a partition 11, such as a tube sheet, into first and second chambers 12 and 13. One or more filter elements 30 (only one of which is shown) having a blind end cap 31 are disposed inside the first chamber 12 and attached to the partition 11. Although the filter elements may be mounted below the partition, in the illustrated embodiment the filter elements may be mounted above the partition. The partition 11 is preferably impervious to the liquid being filtered as well as to gas and is sealingly connected to the inner wall of the housing 10. This embodiment can be used both for filtering a fluid by means of the filter element 30 and for backwashing. During normal filtering operation, a fluid to be filtered flows from the first chamber 12 into the second chamber 13 through the filter element 30, and during backwashing operation, backwashing fluid flows from the second chamber 13 to the first chamber 12 and through the filter elements 30 in the reverse flow direction (indicated by the arrows in the FIGURE).

The housing 10 is preferably constructed so that the filter elements 30 can be readily accessed to permit their replacement. For example, the housing 10 can include upper and lower sections detachably connected to one another. Alternatively, a sealable access port can be formed in the wall of the housing 10 to permit access to the inside of the first chamber 12.

The housing 10 need not have any particular shape or size. Generally the shape of the housing 10 will be selected based on strength considerations so that the housing 10 will have sufficient strength to withstand the pressures exerted on it during filtration or backwashing. For simplicity of structure and operation, the partition 11 is typically disposed in the housing 10 substantially horizontally. In the illustrated embodiment, the first chamber 12 is disposed above the second chamber 13.

A plurality of pipes may be connected to the housing 10 for introducing fluids into and removing fluids from the housing 10. In the illustrated embodiment, a fluid feed pipe 14 and a lower drain pipe 16 are connected to the housing 10 so as to communicate with the inside of the first chamber 12. The fluid feed pipe 14 is used to introduce a fluid to be filtered into the first chamber 12 from an unillustrated source, and the lower drain pipe 16 is used to remove unwanted materials from the first chamber 12 and drain the first chamber 12. A make-up gas feed 26 may communicate with the first chamber 12 preferably just above the partition 11. The make-up gas feed pipe 26 supplies a make-up gas, such as air, to facilitate draining the first chamber 12 through the lower drain pipe 16. It may also serve to vent the first chamber 12. The fluid feed pipe 14, the lower drain pipe 16, and the gas feed pipe 26 are equipped with corresponding control valves 15, 17, and 27 for controlling flow through these pipes.

A filtrate discharge pipe 18, a drain pipe 20, a backwash liquid feed pipe 22, and a pressurized gas feed pipe 24 are connected to the housing 10 so as to communicate with the inside of the second chamber 13. The filtrate discharge pipe 18 is used to remove filtrate, i.e., fluid which has passed through the filter elements 30 from the first chamber 12 into the second chamber 13. The drain pipe 20 is used for removing unwanted materials from the second chamber 13. The backwash liquid feed pipe 22 supplies a suitable backwash liquid to the second chamber 13 from an unillustrated source, and the pressurized gas feed pipe 24 supplies the second chamber 13 with a compressed gas from an unillustrated source.

Each of the pipes 18,20,22 and 24 may be equipped with a corresponding control valve 19,21,23 and 25. The control valves 15,17,19,21,23 and 25 for the various pipes can be controlled manually, or they can be automatically controlled, e.g., made to operate according to a prescribed sequence by an unillustrated programmable control unit.

In the illustrated embodiment, each pipe serves a single function, but it is possible to have a single pipe serve a plurality of functions. For example, one pipe could be used both as a filtrate discharge pipe and as a drain pipe or one pipe could be used both as a filtrate discharge pipe and as a backwash liquid feed pipe. It is also possible to use filtrate accumulated in the second chamber 13 as a backwash liquid, in which case the backwash liquid feed pipe 22 can be eliminated. In addition, it is possible to have more pipes than in the illustrated embodiment. A pressurized gas feed pipe may be coupled to the first chamber 12 to supply a compressed gas to the chamber 12, or a make-up gas feed pipe may be coupled to the second chamber 13 to supply make-up gas as the filtrate is drained. Furthermore, the FIGURE is merely a schematic representation, and the locations of the pipes on the housing 10 are not limited to those shown in the FIGURE.

For each of the filter elements 30, an opening 111 which communicates between the first and second chambers 12 and 13 is formed in the partition 11. Each filter element 30 is connected at one end to the partition 11 so that fluid from the first chamber 12 can enter the opening 111 only by first passing through the filter element 30. Preferably, the filter elements 30 are detachably mounted on the partition 11 so that they can be easily replaced. The size of the opening 111 can be selected based on fluid flow requirements during filtration. In this embodiment, each filter element 30 is disposed entirely within the first chamber 12, although it is possible for the filter elements 30 to extend partway into the second chamber 13. Each filter element may also be connected at the other end to a support plate (not shown) which extends across the housing parallel to the partition.

To backwash the filter assembly shown in the FIGURE, the first chamber drain valve 17 may drain the first chamber 12 via the drain pipe 16. The second chamber 13 may remain full of filtrate, or the second chamber drain valve 21 may be opened to partially drain filtrate from the second chamber 13 via the drain pipe 20 and then closed to leave a sufficient amount of the filtrate in the second chamber to serve as the backwash liquid. Alternatively, the filtrate may be completely drained from the second chamber 13, and once the second chamber drain valve 21 is closed, the backwash liquid 50 may be added to the second chamber 13 via the backwash liquid feed pipe 22 and control valve 23. The amount of backwash liquid initially contained within the second chamber 13 may vary, depending on the number of backwash cycles desired.

While the first chamber drain valve 17 remains open and the first chamber 12 is at atmospheric pressure, the gas feed valve 25 for the gas feed pipe 24 is opened to introduce pressurized gas into the second chamber 13. This abruptly forces the backwash liquid 50 upward into the interior of the filter element 30 and then blows the backwash liquid through the filter element 30 in a reverse direction at a high velocity, cleaning filter elements 30.

The present invention may be used to treat power generator condensate at any acceptable flow rate, consistent with the overall design of the system. Generally, the condensate will pass through the filter medium at a flow rate which is preferably less than or equal to the steady-state condensate flow rate usually employed in the power generating plant.

The present invention can be used either in conjunction with or without a deep bed and filter demineralizer as conventionally used in power generating plants, although, if used in conjunction with a deep bed or filter demineralizer, the filter medium is placed upstream of the deep bed or filter demineralizer. In other words, the condensate is passed through the filter medium prior to a resin bed or downstream of a resin precoat. The treatment of condensate in accordance with the present invention prior to passage of the condensate through a deep bed demineralizer has the benefit of ensuring that the demineralizer is not adversely contaminated with too high a level of particulates, which would reduce the efficiency of the demineralizers and prematurely require their regeneration or replacement.

The following example further illustrates the present invention but, of course, should not be construed as in any way limiting its scope.

EXAMPLE

To demonstrate the increased length of time between required backwashes achieved by the invention, a comparison of backwash cycles was made in a BWR nuclear power generator. A UHMWPE filter medium of the invention was compared to a polypropylene membrane and aramid fiber medium.

The plant conditions during this comparison were: influent iron 13–14 parts per billion, temperature 120–135° F. and flow rate per vessel 3800 gpm. All filter media were of a Pall Ultipleat™ construction with pleats formed in a crescent shape to layover and support each other during forward flow and backwash. The filter pack was wrapped under tension with a stainless steel outerwrap mesh for support during backwash.

All vessels were backwashed using the same backwash method, whereby a gas assisted backwash pressure was applied. Backwash was performed on aramid elements after reaching a pressure drop of 10 psid, later increased to 20 psid in some cases. The pressure drop before backwash for polypropylene elements was 10 psid. The UHMWPE elements were backwashed on a time basis, upon reaching a 30 day operation after the previous backwash.

The area per element for the aramid, polypropylene and UHMWPE elements was 52.5, 40 and 70 sq. ft., respectively, which gave a flow density of 0.30, 0.40 and 0.23 gpm/sq. ft., respectively.

The Table summarizes backwash cycle duration for UHMWPE filters (vessels A and B), polypropylene filters (vessels B and D) and aramid filters (vessels C and E through F).

The UHMWPE filter cycle average length was 30.3 days, while the cycle length of the polypropylene filter was 7.7 days and the aramid filter cycle length was 6.5 days. This is an indication of the UHMWPE media backwashing much more effectively than the other media using the same backwash method.

The backwash energy and effectiveness is a function of the backwash pressure pulse generated during backwash and the backwash flow density per unit area of the filter medium. Since the same backwash method was used for all filters using the same air pressure and volume and the same backwash water volume, the higher area UHMWPE filter received a relatively lower backwash pressure pulse and a relatively lower flow density per unit area of the filter medium and still recovered more completely than the other filters further demonstrating the better backwashing characteristics of UHMWPE filters.

TABLE

BACKWASH CYCLE DURATION
UHMWPE FILTER COMPARISON WITH OTHER FILTERS
CONDENSATE FILTRATION WITHOUT PRECOAT

| | | | | | | | | | | | | | |
|---|---|---|---|---|---|---|---|---|---|---|---|---|---|
| UHMWPE FILTER (VESSEL A) | | | | | | | | | | | | | 35 |
| POYPRO FILTER (VESSEL B) | | | | | | | | | | | | | 45 |
| POYPRO FILTER (VESSEL D) | | | | | | | | | | | | | 44 |
| ARAMID FILTER (VESSEL C) | 68 | 28 | 15 | 12 | 8 | 9 | — | — | — | — | — | 5 | 4.6 |
| ARAMID FILTER (VESSEL E) | 62 | 32 | 11 | 15 | 9 | 8 | 8 | 8 | 5 | — | 5 | 4.3 | 4.5 |
| ARAMID FILTER (VESSEL F) | 62 | 34 | 29 | 10 | 10 | 8 | 8 | 8 | 7 | — | 7 | 5 | 4.6 |

TABLE-continued

BACKWASH CYCLE DURATION
UHMWPE FILTER COMPARISON WITH OTHER FILTERS
CONDENSATE FILTRATION WITHOUT PRECOAT

| | NOV 1994 → | DEC | JAN | FEB | MAR | APR | MAY | JUNE | JULY | AUG | SEPT | OCT | NOV | DEC |
|---|---|---|---|---|---|---|---|---|---|---|---|---|---|---|
| ARAMID FILTER (VESSEL G) | | — | 58 | 32 | 31 | 12 | 14 | 11 | 8 | 9 | — | 7 | 5 | 5 |
| ARAMID FILTER (VESSEL H) | | — | — | — | — | 46 | 30 | 31 | 17 | 17 | — | 10 | 7 | 6.5 |
| | | | | | | ← | | | 1995 | | | | | → |

| | JAN | FEB | MAR | APR | MAY | JUNE | JULY |
|---|---|---|---|---|---|---|---|
| UHMWPE FILTER (VESSEL A) | 16 | — | 20 | 30 | 31 | 30 | 30 |
| POYPRO FILTER (VESSEL B) | 38 | — | 5.6 | 11.5 | 10 | 8.5 | 5 |
| POYPRO FILTER (VESSEL D) | 30 | — | — | 7.5 | 7 | 7 | 7 |
| ARAMID FILTER (VESSEL C) | 7 | — | 4.5 | 4.8 | 4.1 | 3.8 | 3.8 |
| ARAMID FILTER (VESSEL E) | 5 | — | 3.8 | 3.5 | 3.6 | — | — |
| ARAMID FILTER (VESSEL F) | 5.5 | — | 3.8 | 4.1 | 3.4 | — | — |
| ARAMID FILTER (VESSEL G) | 5.2 | — | 3.3 | 3.7 | 3.6 | 3.6 | 3.8 |
| ARAMID FILTER (VESSEL H) | 6.7 | — | 4.2 | 3 | 2.6 | 2.6 | 2.7 |
| ← | | | | 1996 | | | → |

What is claimed:

1. A method for purifying a condensate from a power generating plant to remove iron-containing particulate or colloidal contaminants therefrom, said method comprising:

passing the condensate including the iron-containing contaminants in one direction through a plurality of pleated filter elements contained within a housing, a pleated filter medium contained within each of said pleated filter elements including a pleated hydrophilic film comprising an ultra-high molecular weight polyethylene and having a pore size in the range from about 0.001 micron to about 10 microns, including directing the condensate through the pleated hydrophilic film contained within each of the pleated filter elements, such that the iron-containing contaminants in the condensate are reduced to a level of about 2 parts per billion or less; and cleaning the plurality of pleated filter elements by directing a backwash fluid in an opposite direction through the housing containing said plurality of pleated filter elements, including directing the backwash fluid through the pleated hydrophilic film contained within each of the pleated filter elements.

2. The method of claim 1 wherein passing the condensate through the filter element includes reducing iron-containing contaminants in the condensate to about 1 part per billion or less.

3. The method of claim 1 wherein passing the condensate through the filter element includes reducing iron-containing contaminants in the condensate to about 0.5 part per billion or less.

4. The method of claim 1 further comprising passing the condensate through a demineralizer before or after passing the condensate through the pleated filter element.

5. The method according to claim 1 wherein the pleated filter medium of each pleated filter element includes pleats having a pair of legs and a height h greater than (D−d)/2 and less than $h_{max}=(D^2-d^2)/[4(d+2t)]$ where D and d are an outer diameter and an inner diameter, respectively, of the filter element and t is a thickness of each leg.

6. The method of claim 1 wherein passing the condensate through the plurality of pleated filter elements includes passing a condensate employed in nuclear power generating plants through the plurality of pleated filter elements.

* * * * *